United States Patent
Haino et al.

(10) Patent No.: US 7,907,177 B2
(45) Date of Patent: Mar. 15, 2011

(54) METHOD FOR ELIMINATING ERROR IN CAMERA HAVING ANGULAR VELOCITY DETECTION SYSTEM

(75) Inventors: Masami Haino, Tokyo (JP); Takanori Miki, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 371 days.

(21) Appl. No.: 11/739,807

(22) Filed: Apr. 25, 2007

(65) Prior Publication Data

US 2008/0115562 A1    May 22, 2008

(30) Foreign Application Priority Data

Nov. 16, 2006   (JP) .................. 2006-310678

(51) Int. Cl.
*H04N 5/228* (2006.01)
(52) U.S. Cl. ................... 348/208.99
(58) Field of Classification Search ........... 348/208.99, 348/208.1, 208.2, 208.3, 208.4, 208.5, 208.7, 348/208.12; 73/1.37, 1.38, 1.41; 702/96
See application file for complete search history.

(56) References Cited

U.S. PATENT DOCUMENTS

| | | | | |
|---|---|---|---|---|
| 4,944,587 A * | 7/1990 | Harigae | ............ | 356/139.01 |
| 6,343,188 B1 * | 1/2002 | Morofuji | ............ | 396/55 |
| 2001/0002225 A1 * | 5/2001 | Sekine et al. | ............ | 396/55 |
| 2006/0119710 A1 * | 6/2006 | Ben-Ezra et al. | ........ | 348/208.99 |
| 2006/0227221 A1 * | 10/2006 | Okubo | ............ | 348/208.2 |

FOREIGN PATENT DOCUMENTS

| JP | 5014801 | 1/1993 |
|---|---|---|
| JP | 5336313 | 12/1993 |

* cited by examiner

*Primary Examiner* — Nicholas G Giles
(74) *Attorney, Agent, or Firm* — Thomas J. Strouse; Peyton C. Watkins

(57) ABSTRACT

An error in a camera having angular velocity sensors is eliminated. A camera is placed on a rotating table and rotated, angular velocities are detected by angular velocity sensors, and a CZP chart is photographed. The motion of the camera is computed as a locus of motion of a point light source on an imaging plane from the outputs from the angular velocity sensors. The inclination of the locus motion is compared with the inclination of a zero-crossing line which has been obtained by subjecting the photographed image to Fourier transformation, to thus compute angles of relative inclination of the angular velocity sensors with respect to the image sensor. Further, when no coincidence exists between the zero-crossing line of the data into which a PSF has been Fourier-transformed and a zero-crossing line of the data into which a photographed image has been Fourier-transformed, a computer computes a correction coefficient from a proportion of an interval between the zero-crossing lines, on condition that an error is included in the angular velocity sensors or the focal length of a photographing lens, and the error is eliminated.

2 Claims, 17 Drawing Sheets

↓ FOURIER TRANSMISSION

↓ FOURIER TRANSMISSION

METHOD FOR ELIMINATING ERROR IN CAMERA HAVING ANGULAR VELOCITY DETECTION SYSTEM

CROSS REFERENCE TO RELATED APPLICATIONS

This application claims priority to Japanese Patent Application No. 2006-310678 filed on Nov. 16, 2006, which is incorporated herein by reference in its entirety.

FIELD OF THE INVENTION

The present invention relates to a method for eliminating errors, such as a sensor error, an optical error, and the like, in a camera having an angular velocity detection system.

BACKGROUND OF THE INVENTION

When angular velocity sensors, such as gyroscopic sensors or the like, are used, locations where the angular sensors are to be mounted and mount angles must be adjusted with high accuracy. However, during an actual mounting process, difficulty is encountered in ensuring accuracy for all of a plurality of mass-produced articles. There may arise a case where inclinations occur during mounting of the angular velocity sensors, whereby outputs from the angular velocity sensors differ from values which should be output originally. In a digital camera, the angular velocity sensors are used primarily for correcting camera shake and are materialized by a method for actuating an optical lens in accordance with an output from an angular velocity detection system including an angular velocity sensor, oscillating an image sensor, or the like. In order to correct camera shake with high accuracy, the motion of the camera acquired during camera shake must be accurately determined from an output from the angular velocity detection system.

Japanese Patent Laid-Open Publication No. Hei-5-14801 describes determining a differential motion vector in each field from an image signal output from a CCD; detecting an angular velocity of zero on the basis of the differential motion vector; and setting an offset voltage in accordance with a result of detection.

Japanese Patent Laid-Open Publication No. Hei-5-336313 describes determining a point spread function pertaining to an image signal output from a line sensor, and electrically correcting a positional displacement of the line sensor by means of the point spread function.

However, none of the above-described techniques are sufficient for calibrating the inclinations of the angular velocity sensors with high accuracy. In particular, when the angular velocity sensors are used for correcting camera shake, highly accurate calibration of an inclination is required. Moreover, since there is a potential of the image sensor also remaining inclined, calibration must be performed in consideration of the inclination of the image sensor. Further, even when the inclinations between the angular velocity sensors and the image sensor has been calibrated, there may arise a case where another error, such as a sensitivity error or a gain error, is included in the angular velocity detection system in a combined manner. Specifically, the angular velocity detection system is built of a sensor main body, a high-pass filter, a low-pass filter, and a detection circuit such as an amplifying circuit or the like; and includes, in a complex manner, an error in the sensitivity of the sensor main body, a gain error in an amplifying circuit, and the like. Meanwhile, when a point spread function is computed from outputs from the angular velocity sensors, the focal length of the lens of the camera is used as a calculation parameter. In addition to the errors in the angular velocity sensors, an error in the focal length of the lens can also pose a problem.

SUMMARY OF THE INVENTION

The present invention eliminates an error in an angular velocity detection system provided in a camera, an error in the focal length of a lens, and the like.

The present invention provides a method for eliminating an error in a camera having an angular velocity detection system, the method comprising:

an image acquisition step of acquiring an image by rotating a camera around a reference axis;

a movement locus computation step of computing motion of the camera as a locus of motion of a point light source on an imaging plane, from an output of angular velocity from the angular velocity detection system acquired when the camera has been rotated around the reference axis; and a step of eliminating a plurality of errors included in the output of angular velocity and a photographing lens system, on the basis of the image and the locus of motion.

In the present invention, the step of elimination may also include the steps of:

computing inclination of the locus of motion;

calibrating the output of angular velocity on the basis of the inclination;

computing a point spread function (PSF) from the calibrated locus of motion;

subjecting the PSF to Fourier transformation; and comparing a zero-crossing point of data into which the PSF has been Fourier-transformed with a zero-crossing point of data into which the image has been Fourier-transformed. The PSF is an expression of the locus of motion as a brightness distribution function in each of the pixels of the image sensor.

According to the present invention, there can be eliminated errors such as an error in the angular velocity detection system provided in a camera and an error in the focal length of a camera. The present invention yields an advantage of enhancement of the accuracy of correction of camera shake, which would otherwise arise, e.g., during photographing action.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail based on the following figures, wherein.

DETAILED DESCRIPTION OF THE PREFERRED EMBODIMENT

An embodiment of the present invention will be described hereunder by reference to the drawings. A camera of the present embodiment is based on the premise that both angular velocity sensors and an image sensor are inclined and that an output from the angular velocity detection system includes a plurality of errors, such as an error in the sensitivity of a sensor main body, an error in the gain of an amplification circuit, an error in the focal length of a photographing lens, and the like; calibrating inclinations of the angular velocity sensors and inclination of the image sensors will be described first, and elimination of the plurality of errors will be described next. In the present embodiment, the angular velocity detection system has an angular velocity sensor main body, a high-pass filter, a low-pass filter, and a detecting circuit including an amplification circuit and an A/D conversion circuit.

<Calculation of an Inclination of an Angular Velocity Sensor>

In the present embodiment, the inclination of a gyroscopic sensor attached, as an example of an angular velocity sensor, to a digital camera is computed by utilization of multi-axis sensitivity acquired when the digital camera is placed on top of a rotating table and rotated around only predetermined axes. The digital camera is assumed to be rotated around each of the rotational axes; e.g., a longitudinal direction (a pitch direction), a lateral direction (a roll direction), and a vertical axis (a yaw direction). At this time, when the rotating table is rotated in only the pitch direction, an output is to be output solely from a gyroscopic sensor which is attached to the digital camera and detects an angular velocity of the pitch direction. However, when the gyroscopic sensor is attached at an angle, an angular velocity of the yaw direction is also output. Acquisition of angular velocities in several directions is known as multi-axis sensitivity, and the inclination of the gyroscopic sensor is computed by use of outputs appearing on the multiple axes.

Figure 1:
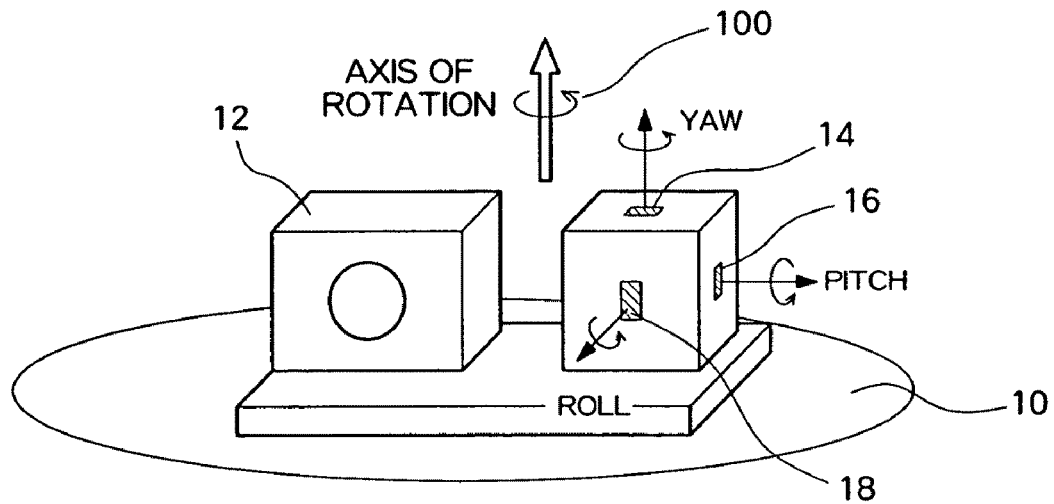
FIG. 1 is a schematic view showing the basic configuration of an angular velocity detection system of an embodiment achieved when a camera is rotated in a yaw direction.
Figure 2:
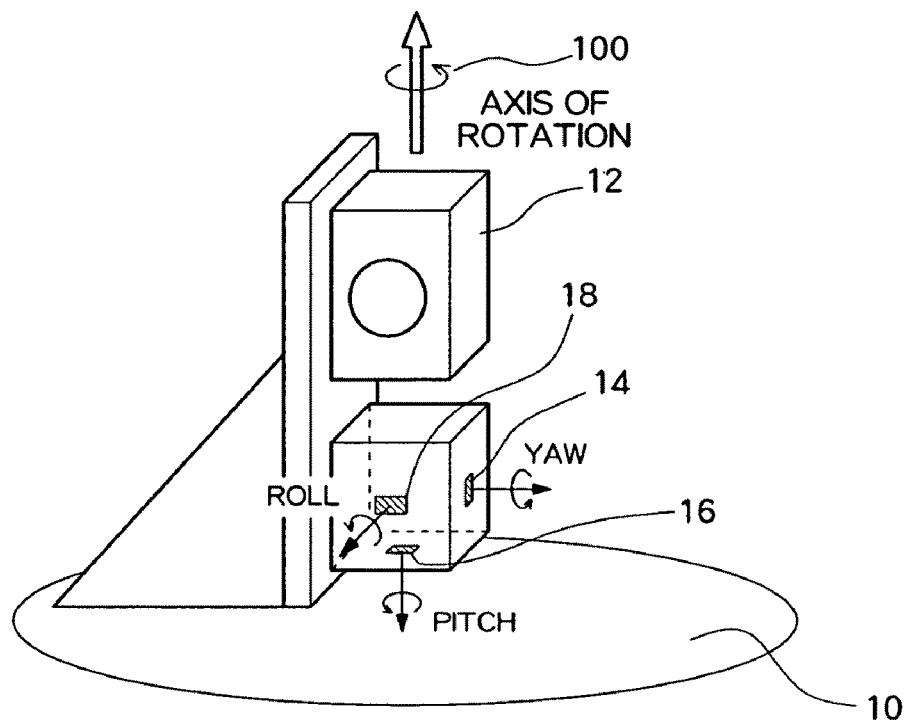
FIG. 2 is a schematic view showing the basic configuration of the angular velocity detection system of the embodiment achieved when the camera is rotated in a pitch direction.

FIG. 1 shows a basic configuration acquired when the inclination of the gyroscopic sensor is detected. A camera 12 and gyroscopic sensors 14, 16, and 18 are mounted on a rotating table 10. The gyroscopic sensor 14 detects an angular velocity of the yaw direction of the camera 12; the gyroscopic sensor 16 detects an angular velocity of the pitch direction of the camera; and the gyroscopic sensor 18 detects an angular velocity in the roll direction of the same. In order to make descriptions easy to understand, the camera 12 and the gyroscopic sensors 14, 16, and 18 are separately illustrated in the drawing. Needless to say, the gyroscopic sensors 14, 16, and 18 may also be set within the camera 12. In FIG. 1, the camera 12 and the gyroscopic sensors 14, 16, and 18 are rotated in the yaw direction; namely, the direction of arrow 100, as a result of rotation of the rotating table 10. FIG. 2 shows a state where the camera 12 and the gyroscopic sensors 14, 16, and 18 are mounted on the rotating table 10 while remaining turned through 90° in FIG. 1. In this state, the camera 12 and the gyroscopic sensors 14, 16, and 18 are rotated in the pitch direction as a result of rotation of the rotating table 10.

Figure 3:
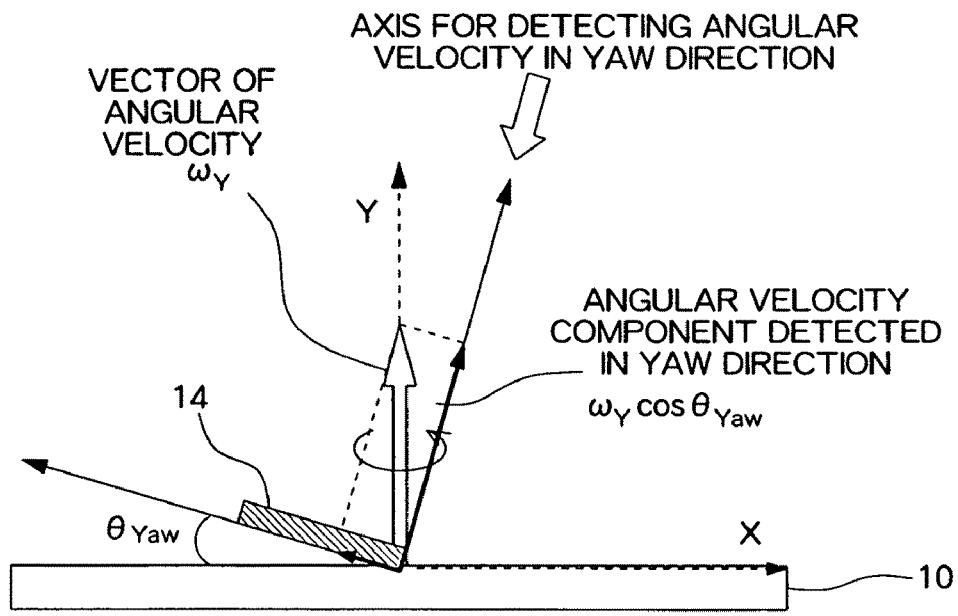
FIG. 3 is a descriptive view of an output from a gyroscopic sensor when the camera is rotated in the yaw direction (around a Y axis)
Figure 4:
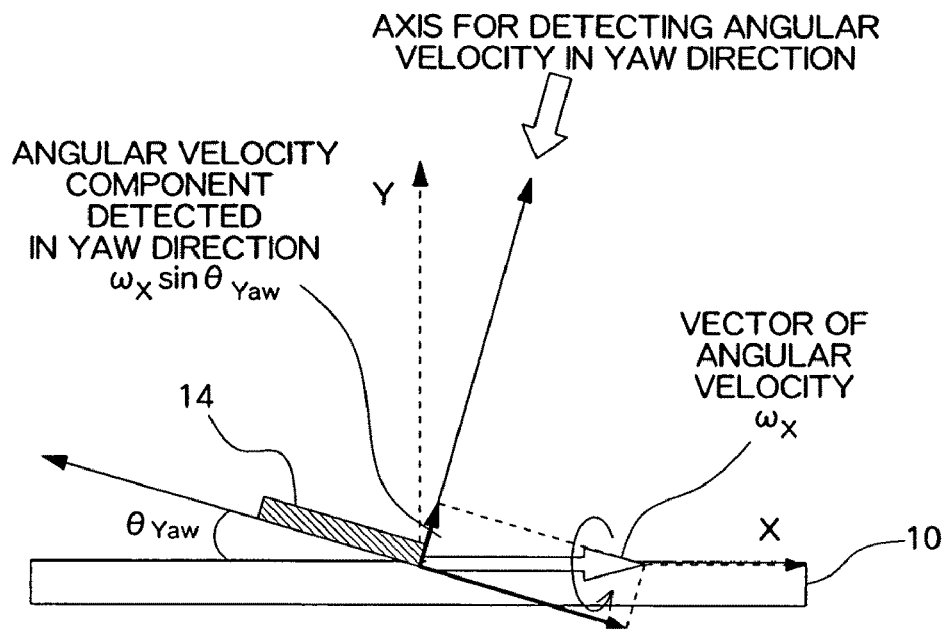
FIG. 4 is a descriptive view of an output from the gyroscopic sensor when the camera is rotated in the pitch direction (around an X axis)

FIG. 3 shows an angular velocity vector component acquired when the gyroscopic sensor 14 belonging to the configuration shown in FIG. 1 is inclined. A detection axis of the gyroscopic sensor 14 for detecting an angular velocity in the yaw direction is inclined at θyaw, and an angular velocity ωY to be originally detected is detected as ωY cos θyaw. Further, FIG. 4 shows an angular velocity vector component acquired when the gyroscopic sensor 14 belonging to the configuration shown in FIG. 2 is inclined. When the detection axis of the gyroscopic sensor 14 that detects an angular velocity in the yaw direction is inclined at θyaw, there is detected ωX sin θyaw of ωX which should not originally be detected.

Figure 5:
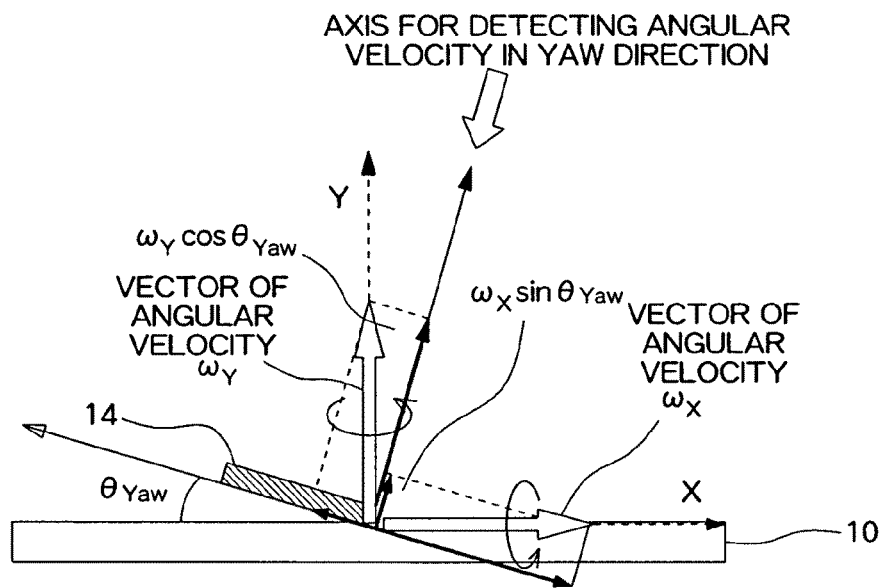
FIG. 5 is a descriptive view of an output from the gyroscopic sensor for the yaw direction when the camera is rotated in both the yaw direction and the pitch direction.

FIG. 5 shows, in combination, the angular velocity vector shown in FIG. 3 and the angular velocity vector shown in FIG. 4. An output ωyaw from the gyroscopic sensor 14 produced when ωX and ωY act on the gyroscopic sensor is expressed as $$\omega yaw = \omega Y \cos \theta yaw + \omega X \sin \theta yaw.$$

Figure 6:
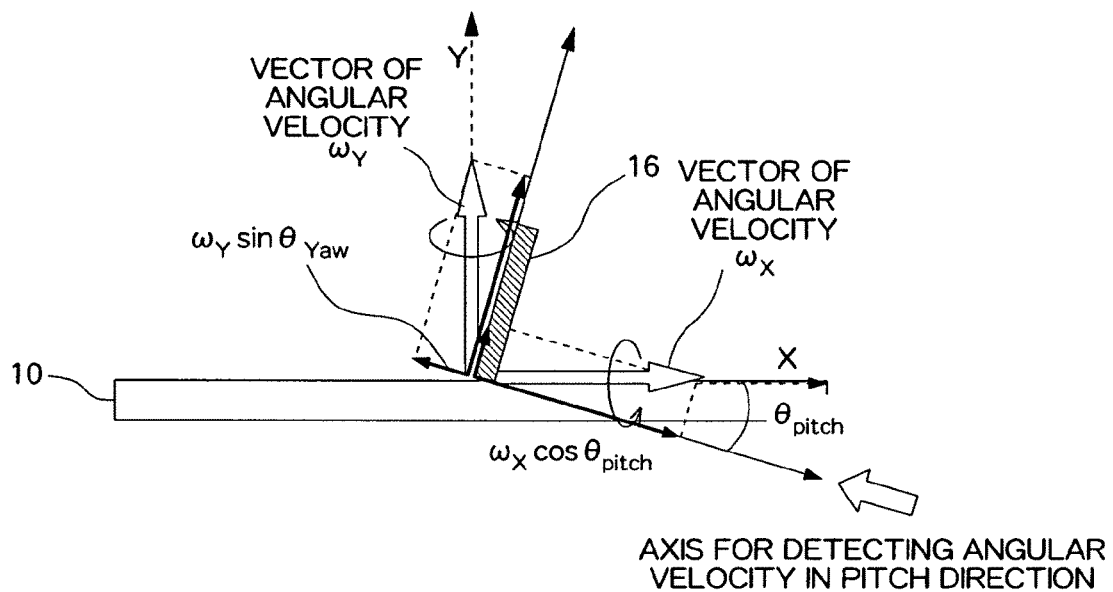
FIG. 6 is a descriptive view of an output from the gyroscopic sensor for the pitch direction when the camera is rotated in both the yaw direction and the pitch direction.

Further, as shown in FIG. 6, when the detection axis of the gyroscopic sensor 16 that detects an angular velocity of the pitch direction is inclined at θpitch, an output ωpitch from the gyroscopic sensor 16 when ωX and ωY act on the gyroscopic sensor is expressed as $$\omega pitch = \omega Y \sin \theta pitch + \omega X \cos \theta pitch.$$

From this equation, we have $$\omega X = (-\omega yaw \sin \theta pitch + \omega pitch \cos \theta yaw)/\cos(\theta yaw + \theta pitch), \text{ and}$$

$$\omega Y = (\omega yaw \cos \theta pitch - \omega pitch \sin \theta yaw)/\cos(\theta yaw + \theta pitch).$$

Reference symbols ωX and ωY designate true angular velocities acquired when the gyroscopic sensors 14 and 16 are accurately attached without an inclination. Reference symbols ωyaw and ωpitch designate measured values which are outputs from the gyroscopic sensors 14 and 16. Consequently, so long as θyaw and θpitch can be acquired, ωX and ωY are determined from ωyaw and ωpitch. θyaw and θpitch can be computed from data to which the motion of the camera acquired from the outputs from the gyroscopic sensor 14 and 16 is represented as a locus of motion of a point light source on an imaging plane.

Figure 7A:
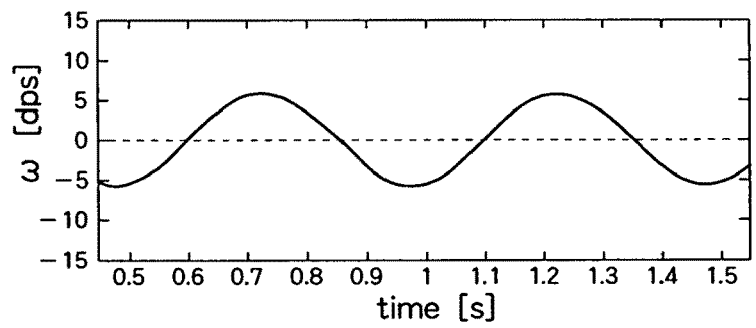
FIG. 7A is a plot showing changes in the output from the gyroscopic sensor for the yaw direction appearing when the camera is rotated in the yaw direction.
Figure 7B:
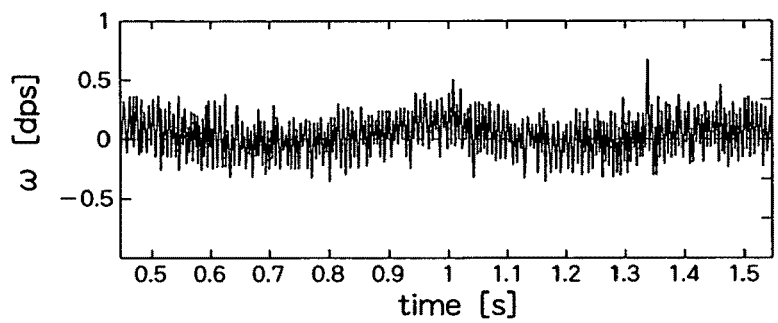
FIG. 7B is a plot showing changes in the output from the gyroscopic sensor for the pitch direction appearing when the camera is rotated in the yaw direction.

FIG. 7A shows changes with time in ωyaw output from the gyroscopic sensor 14 achieved when the rotating table 10 is rotated in the configuration shown in FIG. 1. FIG. 7B shows changes with time in ωpitch output from the gyroscopic sensor 16 achieved when the rotating table 10 is rotated under the same conditions.

Provided that ωX=0 in the above equations $$\omega yaw = \omega Y \cos \theta yaw + \omega X \sin \theta yaw$$

$$\omega pitch = \omega Y \sin \theta pitch + \omega X \cos \theta pitch,$$

we have $$\omega yaw = \omega Y(t) \cos \theta yaw$$

$$\omega pitch = \omega Y(t) \sin \theta pitch.$$

Provided that θyaw=5 deg. or thereabouts is achieved, cos θyaw=0.9961 is acquired, and hence cos θyaw can be approximated to one. Therefore, we have $$\omega yaw = \omega Y(t)$$

$$\omega pitch = \omega Y(t) \sin \theta pitch.$$

In an ideal state where there is no inclination, ωpitch corresponds to 0. When there is an inclination, a changing wave shape attributable to sin θpitch appears in ωpitch as shown in FIG. 7B. When ωyaw and ωpitch are sampled at a sampling frequency fs, the amounts of angular changes Δθx and Δθy per sampling time Δts, which is 1/fs, are defined as $$\Delta \theta x = \omega yaw \cdot \Delta ts = \omega Y(k) \cdot \Delta ts$$

$$\Delta \theta y = \omega pitch \cdot \Delta ts = \omega Y(k) \cdot \Delta ts \cdot \sin \theta pitch,$$

where "k" is a sampling point. Over the entire period of time in which sampling has been performed, changes in rotational angle with time are defined as follows. Namely, we have $$\theta x = \Delta ts \cdot \Sigma \omega Y(k)$$

$$\theta y = \Delta ts \cdot \sin \theta pitch \cdot \Sigma \omega Y(k).$$

Given that the motion of the camera is expressed as the amount of motion of the point light source on an imaging plane, the amounts of motions X and Y are computed as a product of a focal length "f" of the camera 12 and an angular displacement, and hence we have $$X(k) = f \cdot \Delta ts \cdot \Sigma \omega Y(k)$$

$$Y(k) = f \cdot \Delta ts \cdot \sin \theta pitch \cdot \Sigma \omega Y(k).$$

Figure 7C:
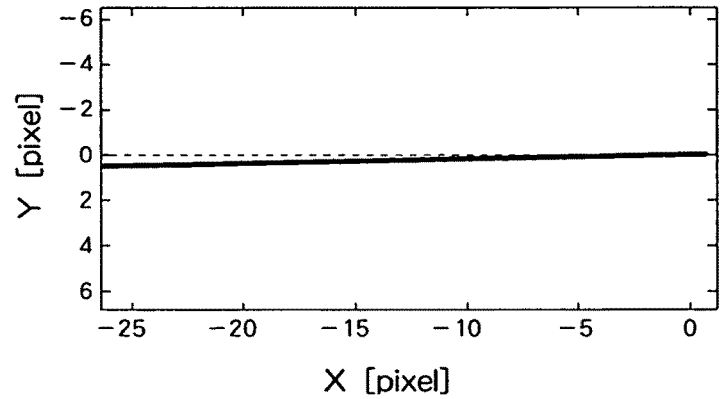
FIG. 7C is a plot showing the locus of motion of a point light source on a CCD acquired when the camera is rotated in the yaw direction.

FIG. 7C shows a locus (X, Y) of the point light source computed as mentioned above. The angle of inclination θpitch of the gyroscopic sensor 16 is given by $$\sin \theta pitch = Y(k)/X(k).$$

So long as the inclination K of the locus shown in FIG. 7C is computed, the inclination of the gyroscopic sensor 16 can be acquired. The inclination of the locus shown in FIG. 7C is computed by means of subjecting the inclination of the locus shown in FIG. 7C to linear approximation by means of the least square method. Since θpitch<<1 is generally considered to stand, sin θpitch=θpitch is acquired, and finally θpitch=K is achieved.

Figure 8A:
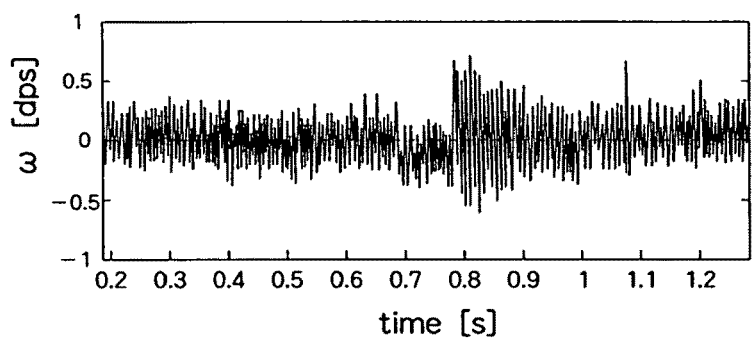
FIG. 8A is a plot showing changes in the output from the gyroscopic sensor for the yaw direction appearing when the camera is rotated in the pitch direction.
Figure 8B:
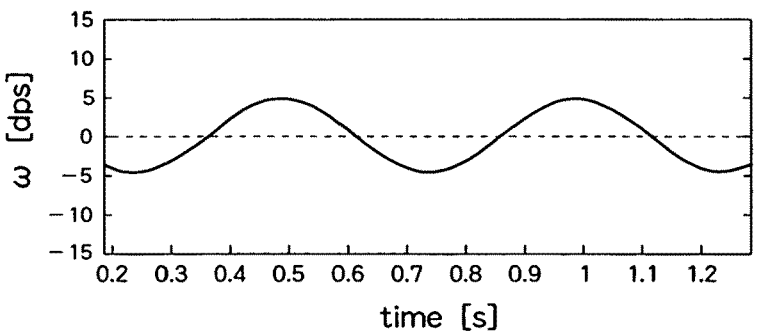
FIG. 8B is a plot showing changes in the output from the gyroscopic sensor for the pitch direction appearing when the camera is rotated in the pitch direction.
Figure 8C:
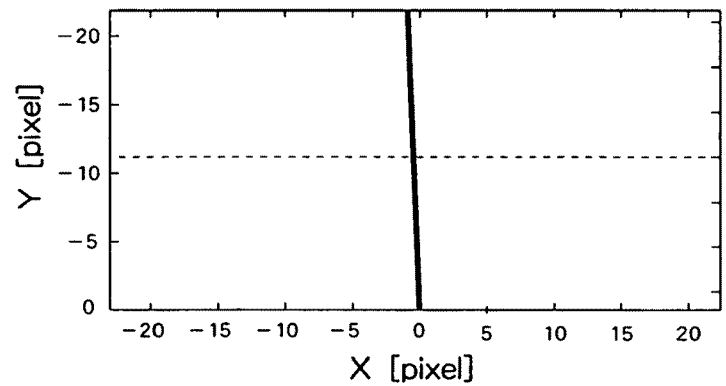
FIG. 8C is a plot showing the locus of motion of a point light source on a CCD acquired when the camera is rotated in the pitch direction.

FIG. 8A shows changes with time in the output ωyaw of the gyroscopic sensor 14 achieved when the rotating table 10 is rotated in the configuration shown in FIG. 2. FIG. 8B shows changes with time in the output ωpitch of the gyroscopic sensor 16 achieved when the rotating table 10 is rotated under the same conditions. FIG. 8C shows a locus of the point light source on the imaging plane. Like the case shown in FIG. 7C, the inclination of the gyroscopic sensor 14 can be acquired, so long as the inclination L of the locus of the point light source is computed. Specifically, θyaw=L is acquired.

So long as θyaw and θpitch have been determined as mentioned above, angular velocities ωX and ωY where the inclinations are calibrated by the following equations are determined.

$$\omega X = (-\omega yaw \sin \theta pitch + \omega pitch \cos \theta yaw)/\cos(\theta yaw + \theta pitch)$$

$$\omega Y = (\omega yaw \cos \theta pitch - \omega pitch \sin \theta yaw)/\cos(\theta yaw + \theta pitch)$$

The locus of the point light source can be acquired by use of ωX and ωY.

Figure 9A:
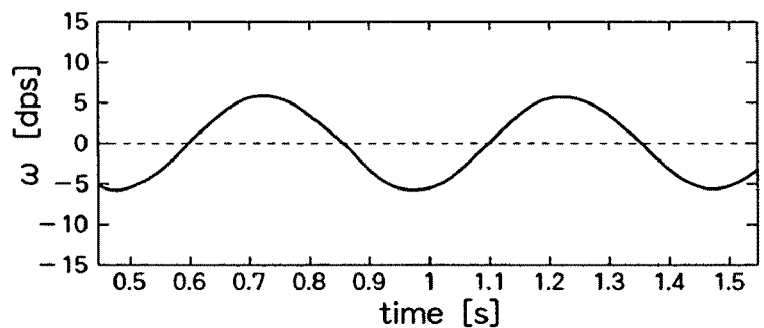
FIG. 9A is a plot showing changes in the calibrated output from the gyroscopic sensor for the yaw direction appearing when the camera is rotated in the yaw direction.
Figure 9B:
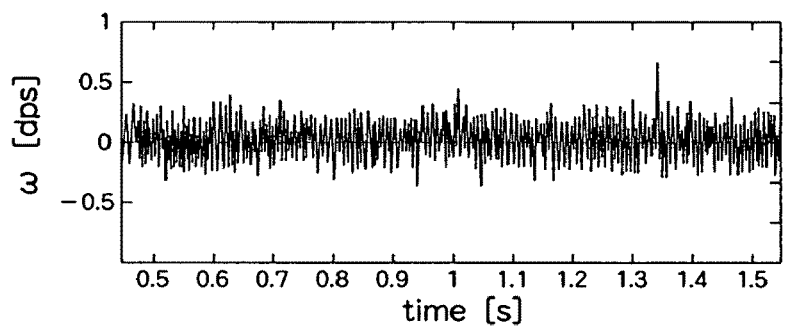
FIG. 9B is a plot showing changes in the calibrated output from the gyroscopic sensor for the pitch direction appearing when the camera is rotated in the yaw direction.
Figure 9C:
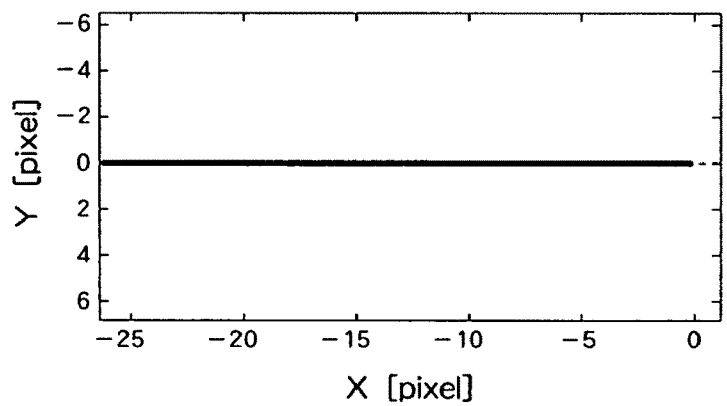
FIG. 9C is a plot showing the calibrated locus of motion of a point light source on a CCD acquired when the camera is rotated in the yaw direction.

FIGS. 9A to 9C show changes in the gyroscopic sensors 14 and 16 with time and the locus of the point light source, which are acquired when the outputs from the gyroscopic sensors 14 and 16 are calibrated by use of the inclination K of the locus of the point light source in FIG. 7C. FIG. 9B shows changes with time in the gyroscopic sensor 16, and the inclination sin θpitch is eliminated, so that a value of essentially zero is achieved. FIG. 9C shows a locus of the point light source, and the inclination is essentially zero.

Figure 10A:
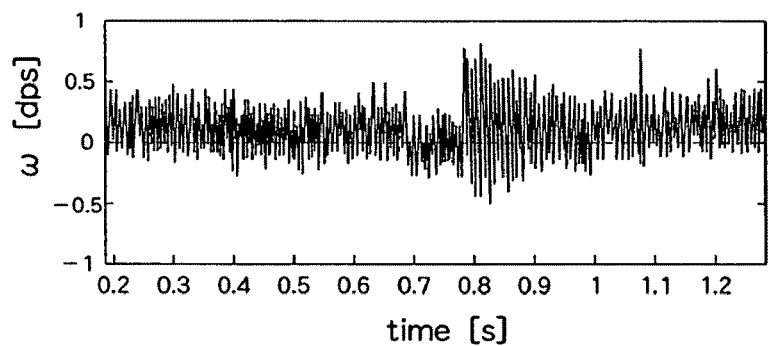
FIG. 10A is a plot showing changes in the calibrated output from the gyroscopic sensor for the yaw direction appearing when the camera is rotated in the pitch direction.
Figure 10B:
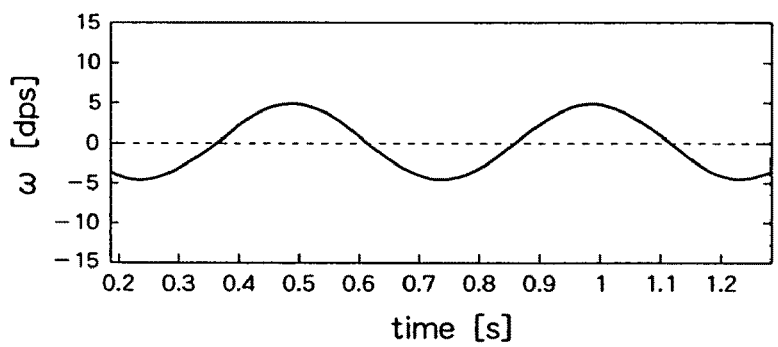
FIG. 10B is a plot showing changes in the calibrated output from the gyroscopic sensor for the pitch direction appearing when the camera is rotated in the pitch direction.
Figure 10C:
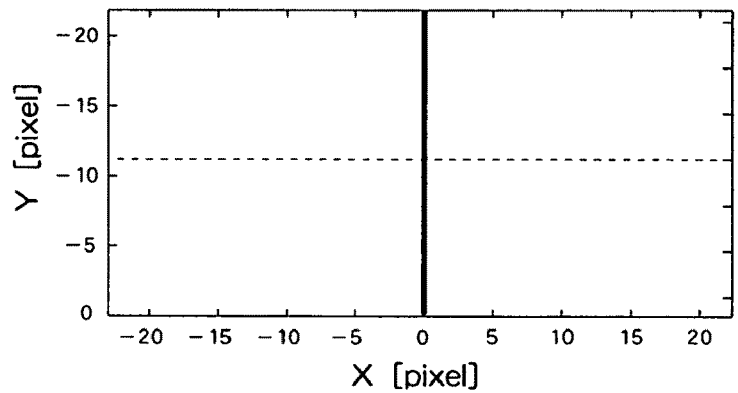
FIG. 10C is a plot showing the calibrated locus of motion of a point light source on a CCD acquired when the camera is rotated in the pitch direction.

FIGS. 10A to 10C show changes with time in the gyroscopic sensors 14 and 16 and the locus of the point light source, which are acquired when outputs from the gyroscopic sensors 14 and 16 are calibrated by use of the inclination L of the locus of the point light source shown in FIG. 8C. FIG. 10C shows the locus of the point light source, and the inclination is likewise calibrated to nearly 90°.

Figure 11:
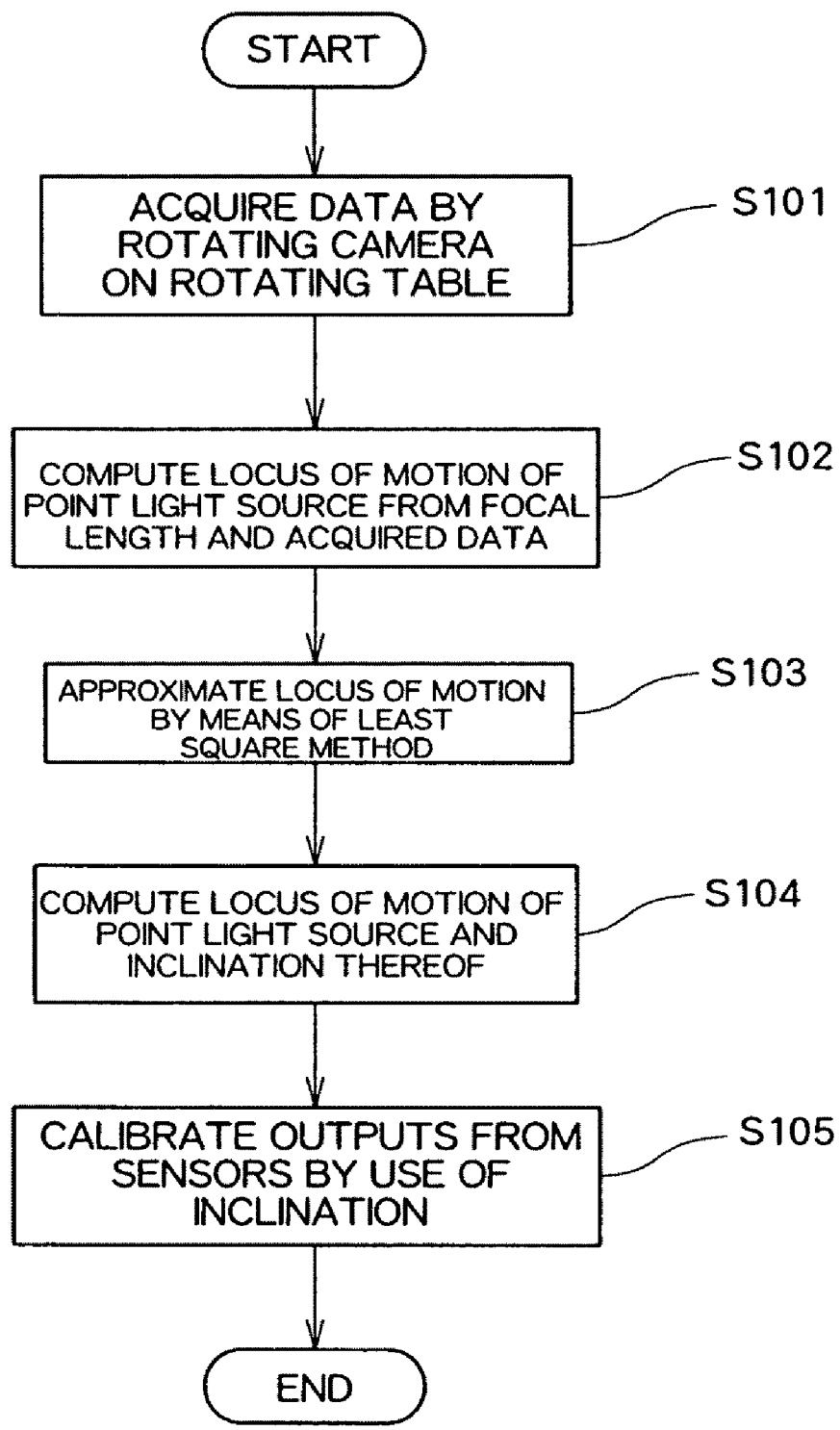
FIG. 11 is a basic flowchart of the angular velocity detection system of the embodiment.

FIG. 11 shows a flowchart of basic processing mentioned above. First, the camera 12 is placed on the rotating table 10, and the rotating table 10 is rotated around a predetermined reference axis, whereby data output from the respective gyroscopic sensor 14 and 16 are acquired (S101). The motion of the camera 12 expressed as the locus (X, Y) of motion of the point light source on the imaging plane is computed from the focal length of the camera 12 and the acquired data. After computation of the locus of motion, the locus of motion is linearly approximated by means of the least square method, or the like (S103), and the inclination of the locus of motion is computed (S104). The outputs from the gyroscopic sensors 14 and 16 are calibrated on the basis of the thus-computed inclination (S105).

<Detection of the Inclination of the Image Sensor>

Figure 12:
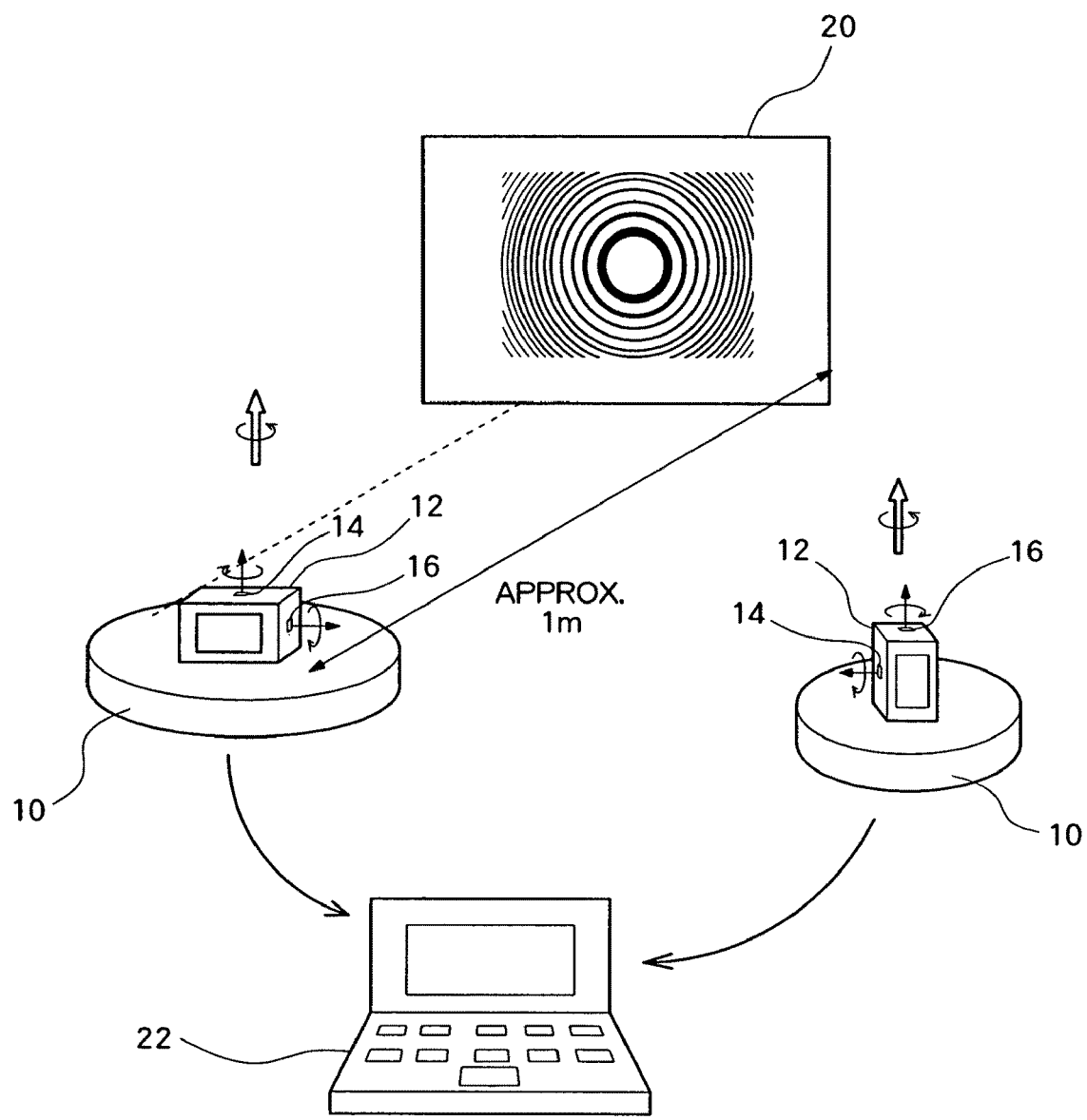
FIG. 12 is a detailed schematic view of the angular velocity detection system of the embodiment.

The inclinations of the gyroscopic sensors 14 and 16 can be detected as the inclination of the locus of the point light source on the imaging plane as mentioned above. However, there may also be a case where the accuracy of attachment of the image sensor is low and the image sensor is inclined. In such a case where the inclinations of the gyroscopic sensors 14 and 16 are not inclinations in absolute coordinates (coordinates by reference to the vertical direction and the horizontal direction), and angles of inclinations relative to the image sensor must be determined. In the present embodiment, there will now be described processing using an image including signals of all frequency domains photographed by the rotating camera 12; for instance, a CZP (Circular Zone Plate) chart image in a case where both the gyroscopic sensors 14 and 16 and the imager sensor are inclined. FIG. 12 shows an embodiment where the inclination of the image sensor can also be calibrated. Like the embodiment where the inclination of the gyroscopic sensor is calibrated, the camera 12 is placed on the rotating table 10, and the rotating table 10 is rotated in the yaw direction as well as in the pitch direction. The camera 12 is equipped with the gyroscopic sensor 14 for detecting an angular velocity in the yaw direction and the gyroscopic sensor 16 for detecting an angular velocity in the pitch direction. The sensors detect an angular velocity of the yaw direction and an angular velocity of the pitch direction, which are associated with rotation of the rotating table 10. In the drawing, as in the case of a general designation, a rotation around a center axis (a Y axis) penetrating through upper and lower surfaces of the camera 12 is taken as a rotation in the yaw direction, and a rotation around a center axis (an X axis) penetrating through the right-side surface and the left-side surface of the camera 12 is taken as a rotation in the pitch direction. Angular velocities are detected by means of the gyroscopic sensors 14 and 16, and a CZP chart 20 is photographed by the camera 12. Although a distance between the rotating table 10 and the CZP chart 20 is arbitrary, a photographing distance including a Nyquist frequency is preferable. An obtained image is an image deteriorated by the shake stemming from rotation. Outputs from the gyroscopic sensors 14 and 16 and a photographed image (a RAW image or a JPEG compressed image) are supplied to a computer 22. The computer 22 detects the inclinations of the gyroscopic sensors 14 and 16 with respect to the image sensor by use of these sets of data, and the outputs from the gyroscopic sensors 14 and 16 are calibrated on the basis of the detected inclinations.

Figure 13:
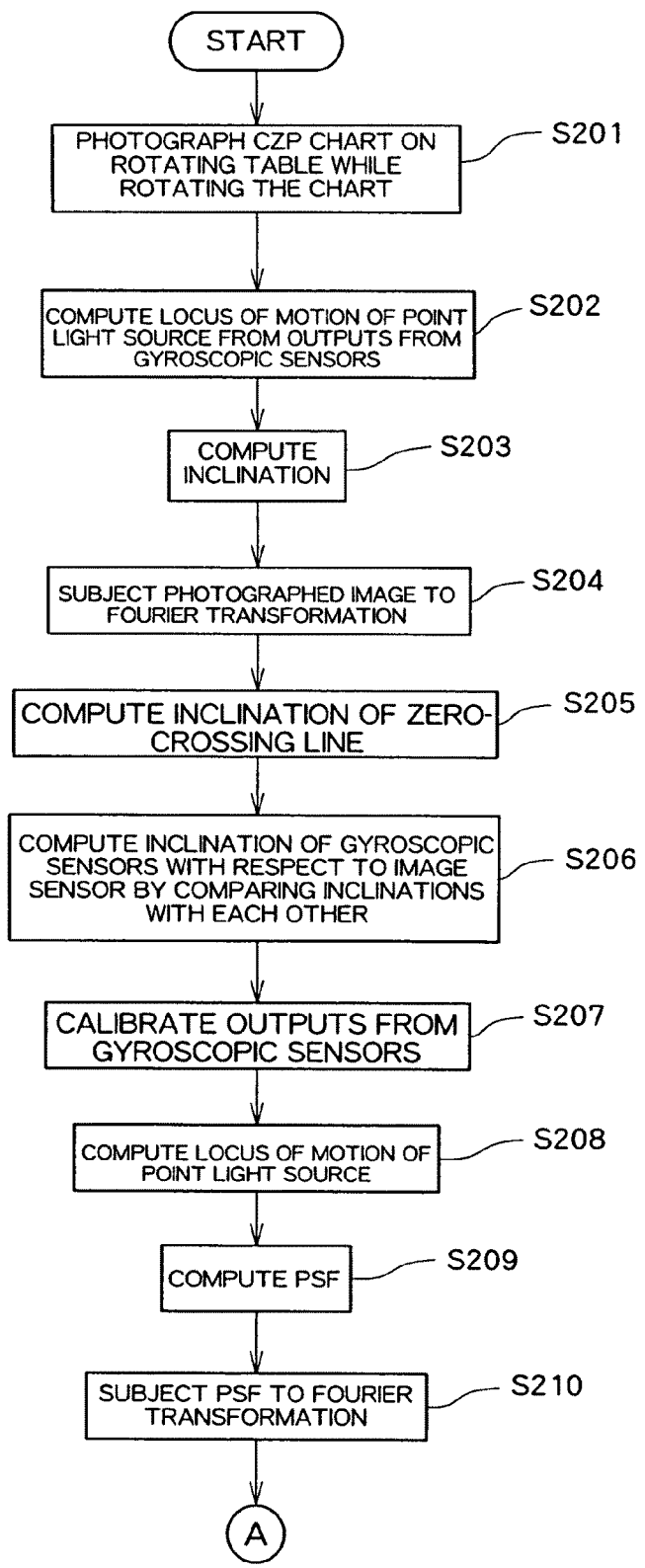
FIG. 13 is a detailed flowchart (part 1) of the angular velocity detection system of the embodiment.

FIG. 13 shows a detailed processing flowchart of the present embodiment. First, the camera 12 is placed on the rotating table 10, and the CZP chart 20 is photographed while the rotating table 10 is being rotated. The angular velocity θyaw of the yaw direction detected by the gyroscopic sensor 14 during rotation, the angular velocity ωpitch of the pitch direction detected by the gyroscopic sensor 16 during rotation, and the image photographed during rotation are supplied to the computer 22.

The computer 22 performs processing below, to thus detect angles of relative inclination between the image sensor and the gyroscopic sensors 14 and 16. Specifically, as described above, the motion of the camera is computed as the locus (X, Y) of motion of the point light source on the imaging plane, from ωyaw output from the gyroscopic sensor 14, ωpitch output from the gyroscopic sensor 16, the focal length "f" of the imaging lens, and the sampling frequency Δts (S202), and the inclination Y/X of the locus of motion is computed (S203). In relation to the locus X, a changing angle Δθ acquired during a minute period of time Δt is expressed as $\omega X \times \Delta t$. The amount of displacement Δx is determined by $f\Delta\theta$, and the locus X achieved during the period of an exposure time is computed by an equation of $X=\Sigma f\Delta\theta$. In more detail, provided that Sen. is the sensitivity of a gyroscopic sensor, Gain is a gain of the detecting circuit, Voffset is an offset voltage of the gyroscopic sensor, Vout is a voltage output from the gyroscopic sensor, and fs is a sampling frequency, the locus X is computed by $X=f/(Sen.\times Gain)\cdot\pi/180/fs\cdot\Sigma(Vout-Voffset)$ (the same also applies to the locus Y)

The thus-computed locus corresponds to the inclinations of the gyroscopic sensors 14 and 16 in the absolute coordinates.

Meanwhile, the computer 22 detects the inclination of the image sensor from the photographed image of the CZP chart. Specifically, the photographed image of the CZP chart is subjected to Fourier transformation (S204), thereby extracting a zero-crossing line (see FIG. 17 and the like)—which is a line obtained by connecting the photographed image of the CZP chart with a zero-crossing point of the Fourier-transformed data—and computing the inclination of the zero-crossing line (S205). The zero-crossing line of the data into which the photographed image of the CZP chart has been Fourier-transformed becomes, unless the image sensor is inclined, parallel to the vertical direction (the direction Y) with regard to the rotation in the yaw direction and parallel to the horizontal direction (the direction X) with regard to the rotation in the pitch direction. However, when the image sensor is attached at an inclination with respect to the X-Y axis, the zero-crossing line becomes inclined, and the degree of inclination is dependent on the inclination of the image sensor. Accordingly, the angles of relative inclination of the gyroscopic sensors 14 and 16 with respect to the image sensor can be computed by comparing the inclination computed in S203 with the inclination computed in S205 (S206). When the two inclinations are equal to each other, no relative inclinations exist between the image sensor and the gyroscopic sensors 14 and 16, and calibration of the outputs from the gyroscopic sensors attributable to an inclination does not need to be performed. When the inclinations differ from each other, angles of relative inclination are computed by means of a subtraction of (the inclination of the locus of motion)—(the inclination of the zero-crossing line of the data into which the photographed image of the CZP chart has been Fourier-transformed). For instance, in connection with the rotation in the yaw direction (around the Y axis), θpitch which is the inclination of the gyroscopic sensor 16 is computed from the locus of motion. The inclination θ of the image sensor is detected from the inclination of the zero-crossing line of the data—into which the photographed image of the CZP chart has been Fourier-transformed—with respect to the Y axis. An angle θyaw' of relative inclination of the gyroscopic sensor 16 with respect to the image sensor is detected by computing a difference between the detected inclination and the computed inclination. Likewise, in connection with the rotation in the pitch direction (around the X axis), θyaw which is the inclination of the gyroscopic sensor 14 is computed from the locus of motion. The inclination of the image sensor is detected from the inclination of the zero-crossing line of the data—into which the photographed image of the CZP chart has been Fourier-transformed—with respect to the X axis. An angle θpitch' of relative inclination of the gyroscopic sensor 14 with respect to the image sensor is detected by computing a difference between the detected inclination and the computed inclination.

Figure 21A:
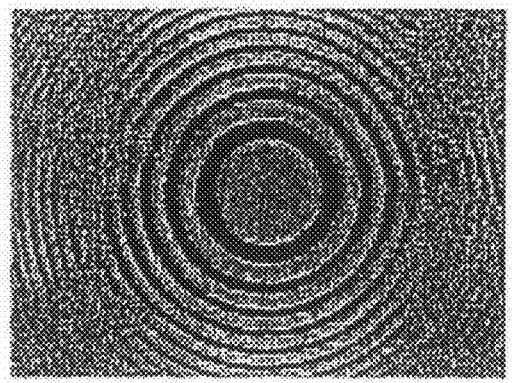
FIG. 21 is a descriptive view of double Fourier transformation of a photographed image of a CZP chart.
Figure 21B:
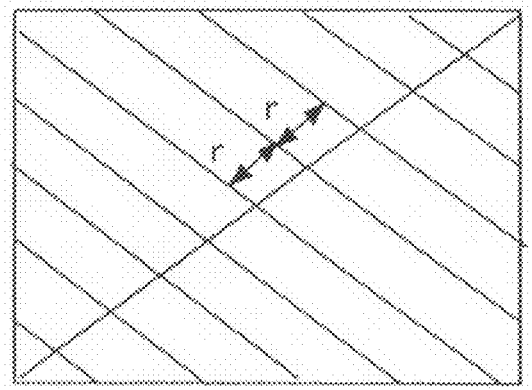
Figure 21C:
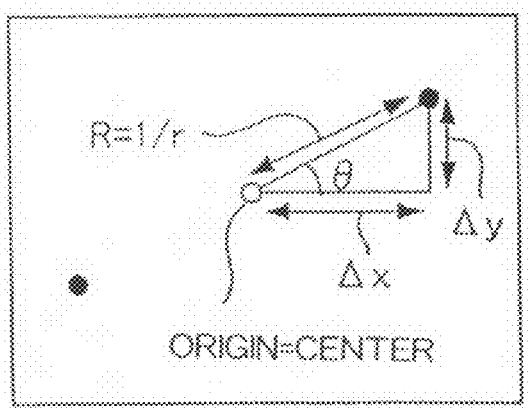

Processing pertaining to S205; namely, determination of the inclination of the zero-crossing line of the data into which the photographed image of the CZP chart has been Fourier-transformed, can be performed by subjecting the photographed image of the CZP chart to Fourier transformation and subjecting the resultantly-acquired data further to Fourier transformation. FIG. 21 shows a result achieved by means of subjecting a photographed image of a CZP chart (FIG. 21A) to Fourier transformation (FIG. 21B) and subjecting the resultant data further to Fourier transformation (FIG. 21C). Although the zero-crossing line should originally have an inclination of θ because contrast achieved over the entire frequency domain is constant, an inclination arises in the zero-crossing line because the image sensor is inclined. The data—into which the photographed image of the CZP chart has been Fourier-transformed—are further subjected to Fourier transformation, and the resultant data are plotted, whereby a point where brightness assumes a value of zero appears as a peak. The inclination θ of the image sensor is computed as $\tan\theta = \Delta y/\Delta x$. The inclination θ of the image sensor can also be determined by subjecting a photographed image of a CZP chart to Fourier transformation and subjecting the resultant data to Hough transformation, in addition to subjecting the photographed image of the CZP chart to Fourier transformation and subjecting the resultant data further to Fourier transformation. In this case, θ appears as the inclination of a straight line on the Hough-transformed data. Hough transformation is more preferable than Fourier transformation, because the Hough transformation involves a smaller amount of computation.

After the angles θpitch' and θyaw' of relative inclination of the gyroscopic sensors 14 and 16 with respect to the image sensor have been computed, outputs from the gyroscopic sensors 14 and 16 are calibrated by use of the angles of inclination. Specifically, the outputs from the gyroscopic sensors 14 and 16 are calibrated by use of $$\omega X = (-\omega\text{yaw} \sin\theta\text{pitch}' + \omega\text{pitch} \cos\theta\text{yaw}')/\cos(\theta\text{yaw}' + \theta\text{pitch}') \text{ and}$$

$$\omega Y = (\omega\text{yaw} \cos\theta\text{pitch}' - \omega\text{pitch} \sin\theta\text{yaw}')/\cos(\theta\text{yaw} + \theta\text{pitch}') \ (S207).$$

Figure 15:
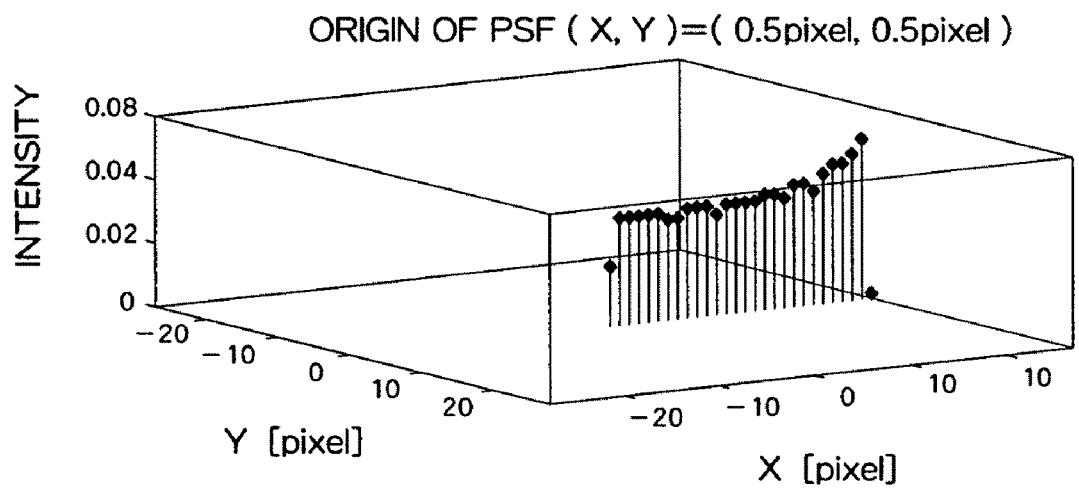
FIG. 15 is a descriptive view of a PSF acquired when the camera is rotated in the yaw direction.
Figure 16:
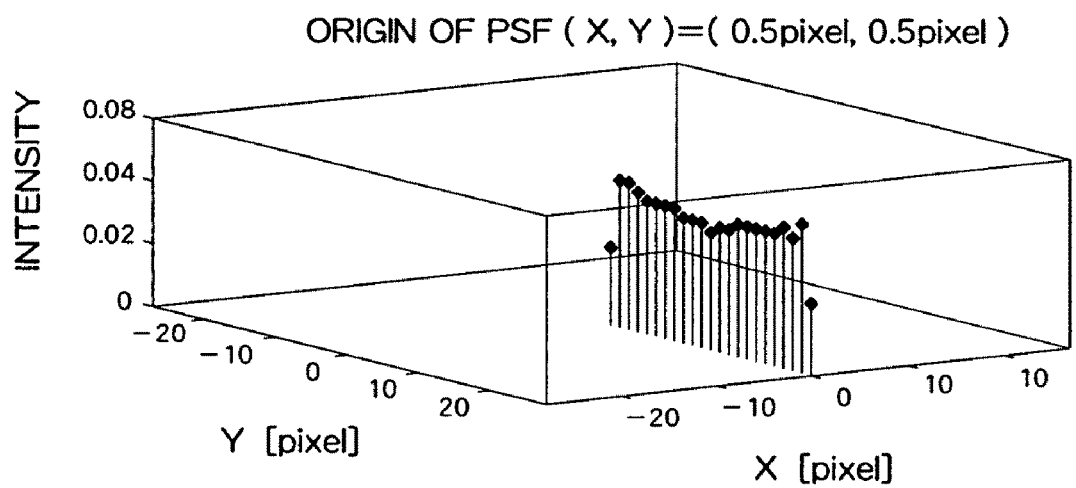
FIG. 16 is a descriptive view of the PSF acquired when the camera is rotated in the pitch direction.

As mentioned previously, θyaw' computed in S206 is an angle of relative inclination of the gyroscopic sensor 14 with respect to the image sensor, and θpitch' computed in S206 is an angle of relative inclination of the gyroscopic sensor 16 with respect to the image sensor. Put another way, θyaw' and θpitch' are angles of inclination of the X and Y directions of the image sensor with respect to the detection axes of the gyroscopic sensors 14 and 16. After the outputs from the gyroscopic sensors 14 and 16 have been calibrated, the locus of motion of the point light source is recomputed from the calibrated outputs (S208). The PSF is computed from the locus of motion (S209). As mentioned previously, the PSF is an expression of the locus of motion as a brightness distribution function for each of the pixels of the image sensor, and a matrix size is determined according to an area of the locus of motion. FIGS. 15 and 16 show an example PSF. FIG. 15 shows a PSF pertaining to the locus of motion of the point light source (the locus of motion acquired after calibration of the outputs performed in S207) acquired when the rotating table 10 is rotated in the yaw direction (around the Y axis). FIG. 16 shows a PSF pertaining to the locus of motion of a point light source (the locus of motion acquired after calibration of the outputs performed in S207) achieved when the rotating table 10 is rotated in the pitch direction (around the X axis). Each of the points shows intensity at the position (X, Y) of a pixel. After computation of a PSF, the computer 22 subjects the computed PSF further to Fourier transformation (S210).

Figure 14:
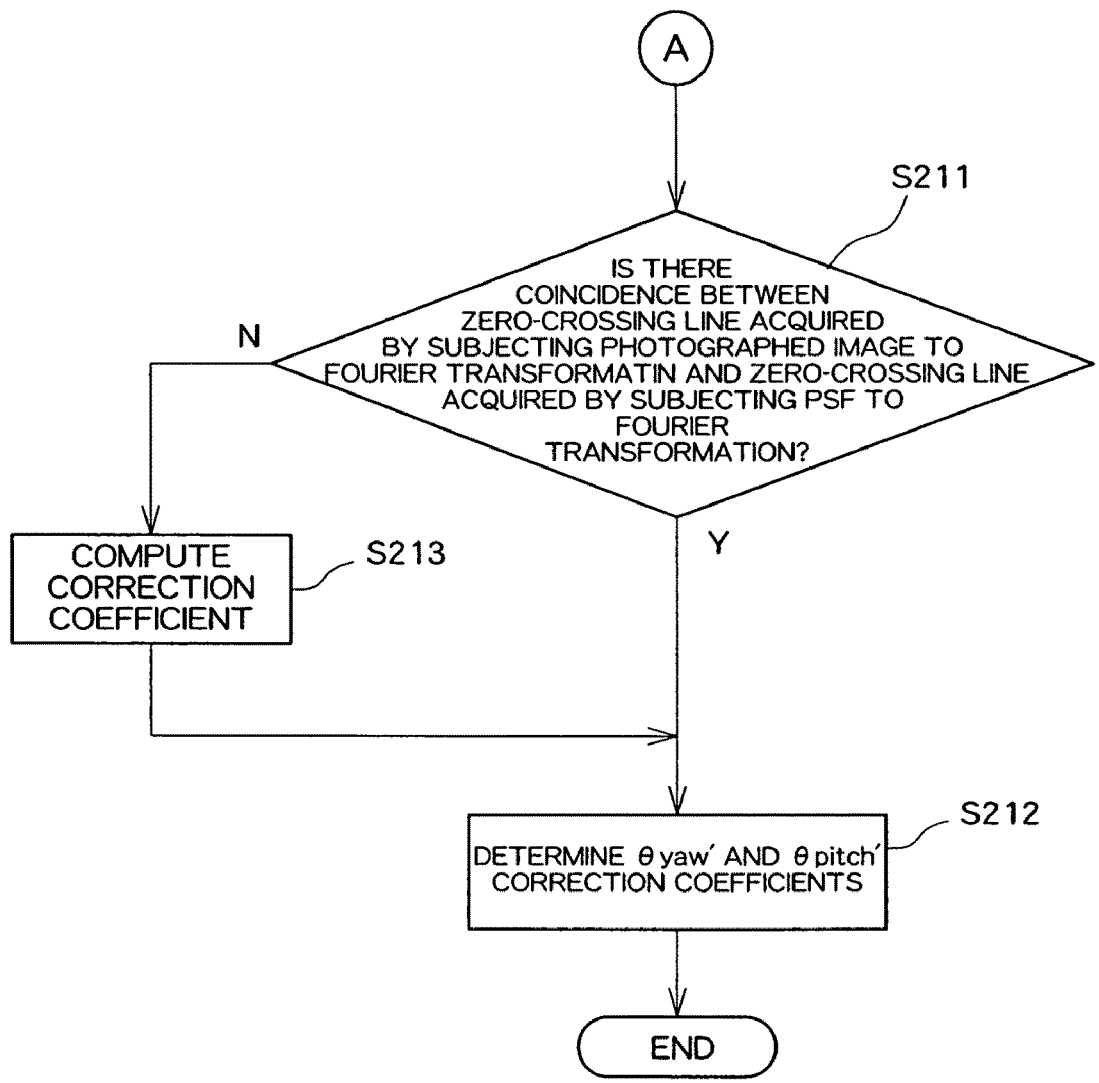
FIG. 14 is a detailed flowchart (part 2) of the angular velocity detection system of the embodiment.

As shown in FIG. 14, the zero-crossing line of the data into which the PSF acquired in S201 has been Fourier-transformed is compared with the zero-crossing line, acquired in S202 or S203, of the data into which the photographed image of the CZP chart has been Fourier-transformed, thereby determining whether or not a coincidence exists between the zero-crossing lines (S211). The photographed image of the CZP chart is deteriorated by action of the PSF that serves as a deterioration function, and the influence of deterioration appears as a change in a frequency component of the photographed image. Therefore, if the PSF computed from the locus of motion determined by calibration of the outputs is a correct PSF, the zero-crossing line of the data into which the photographed image of the CZP chart has been Fourier-transformed has to coincide with the zero-crossing line of the data into which the PSF has been Fourier-transformed. When the result of determination rendered in S211 shows a coincidence between the zero-crossing lines (i.e., presence of a uniform line interval), the PSF computed in S209 is a correct PSF. Angles θyaw' and θpitch' of relative inclination of the gyroscopic sensors 14 and 16 are determined on the assumption that calibration of the outputs from the gyroscopic sensors 14 and 16 is correct (S212). The thus-determined θyaw' and θpitch' are stored in advance in, e.g., ROM of the camera 12, and used for calibrating outputs from gyroscopic sensors when the user actually performs photographing.

<Elimination of Errors>

Meanwhile, there may also be a case where no coincidence exists between the zero-crossing lines. The zero-crossing line determined from the photographed image of the CZP chart corresponds to data acquired through actual measurement, whilst the zero-crossing line of the data into which the PSF has been Fourier-transformed corresponds to a theoretical value computed by means of taking, as parameters, the focal length "f" of the photographing lens of the camera, the sensitivities of the angular velocity sensors constituting the angular velocity detection system, and the gain of the amplifying circuit. When no coincidence exists between the zero-crossing lines, computation of the zero-crossing line of the data into which the PSF has been Fourier-transformed is not accurate; more specifically, this signifies that various parameters included in the process of computation include errors. An error in the focal length "f" of the photographing lens, an error in the sensitivities of the angular sensors, and an error in the gain of the amplifying circuit vary from one camera to another. Difficulty is encountered in individually detecting or predicting the amounts of errors included in parameters. In contrast, the total influence of the error in the focal length "f" of the photographing lens, the sensitivity error, and the gain error leads to occurrence of an error in computation of a PSF, whereby a mismatch arises between the zero-crossing lines. Accordingly, comparison between the zero-crossing lines enables computation of a composite error which is a collection of the error in the focal length "f," the sensitivity error, and the gain error, and collective calibration can be performed by use of the complex error. Specifically, when the zero-crossing lines do not coincide with each other, a coefficient is computed such that an interval between the zero-crossing lines achieved by Fourier transformation of the PSF coincides with the zero-crossing line achieved by Fourier transformation of the photographed image of the CZP chart (S213). Provided that an interval between zero-crossing lines acquired by Fourier transformation of a PSF is taken as "a" and an interval between the zero-crossing lines acquired by Fourier-transformation of the photographed image of the CZP chart is taken as "b," the coefficient C is computed by C=b/a. This coefficient C represents a complex error, and outputs from the gyroscopic sensors are calibrated by reference to the coefficient C. Computation of the locus of motion is performed through use of a value which has been calibrated by reference to the coefficient C according to an equation of $X = C \cdot f \cdot (Sen. \times Gain) \cdot \pi/180/fs \cdot \Sigma(Vout - Voffset)$, wherein f: a focal length of the photographing lens
Sen.: angular velocity sensor sensitivity
Gain: a gain of the amplification circuit
fs: a sampling frequency
Vout: angular velocity sensor output, and
Voffset: an offset voltage (computed by another means).

A determination as to whether or not a coincidence exists between the zero-crossing lines is rendered specifically by means of comparing a differential value between the zero-crossing lines with a threshold value. When the differential value is equal to or smaller than the threshold value, the zero-crossing lines are determined to coincide with each other. In contrast, when the zero-crossing lines are determined to coincide with each other, the error in focal length, the sensitivity error, and the gain error are sufficiently small that they can be disregarded.

Figure 17A:
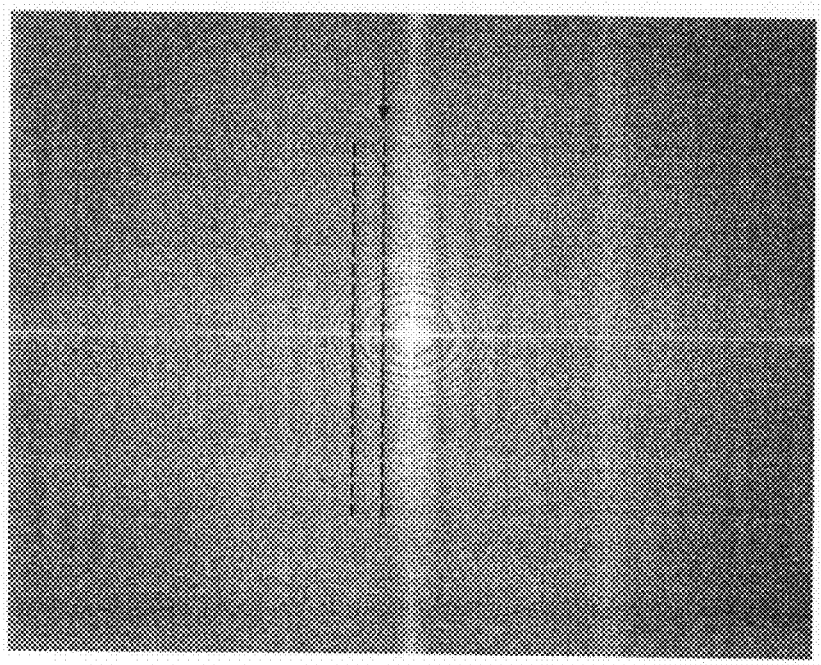
FIG. 17 is a descriptive view of a photographed image during rotation of the camera in the yaw direction and a result of Fourier transformation of a yet-to-be-calibrated PSF.
Figure 17B:
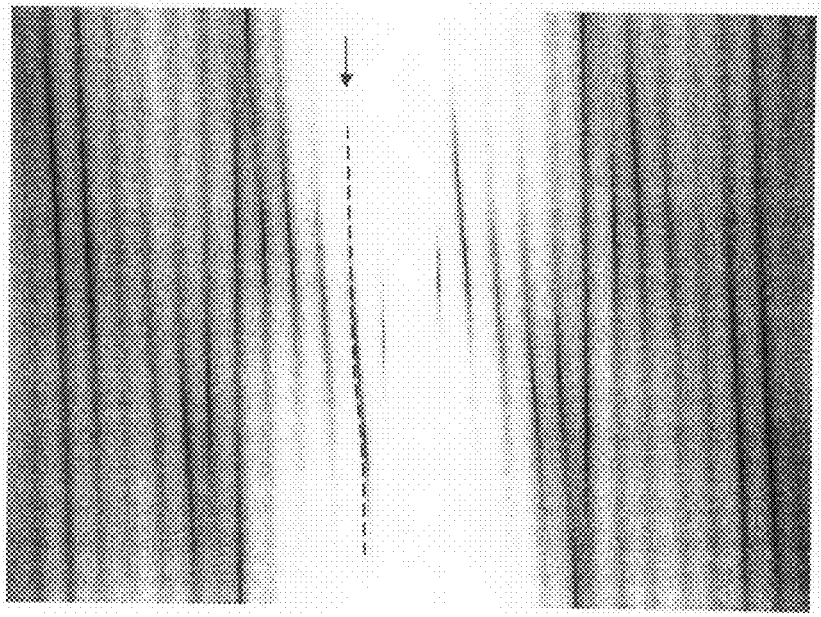

FIG. 17A shows a result of Fourier transformation of a photographed image of a CZP chart achieved when the camera 12 is rotated in the yaw direction, and FIG. 17B shows a result of Fourier transformation of the PSF performed before calibration of outputs from the gyroscopic sensors 14 and 16 when the camera 12 is rotated in the yaw direction. In these drawings, the zero-crossing lines are designated by broken lines. The result of Fourier transformation of the yet-to-be-calibrated PSF shows a twist in the zero-crossing line, and no coincidence exists between the two zero-crossing lines. When the degree of accuracy of the PSF is high, a coincidence has to exist between the zero-crossing line of the data into which the photographed image of the CZP chart has been Fourier-transformed and the zero-crossing line acquired by Fourier-transformation of the PSF. Therefore, the twist signifies that the gyroscopic sensors 14 and 16 are inclined.

Figure 18A:
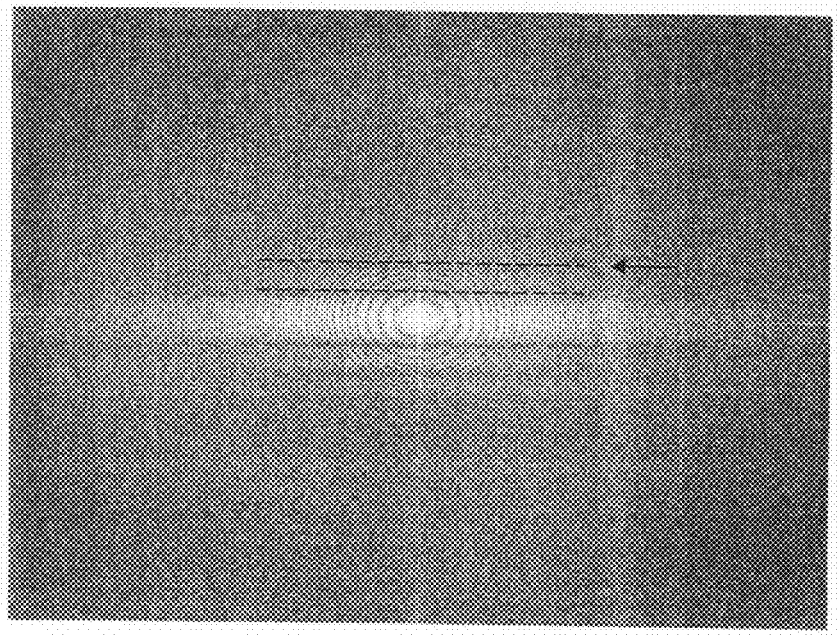
FIG. 18 is a descriptive view of a photographed image during rotation of the camera in the pitch direction and a result of Fourier transformation of the yet-to-be-calibrated PSF.
Figure 18B:
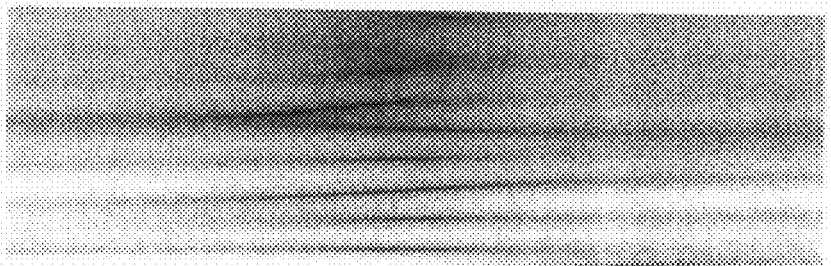
Figure 18B:
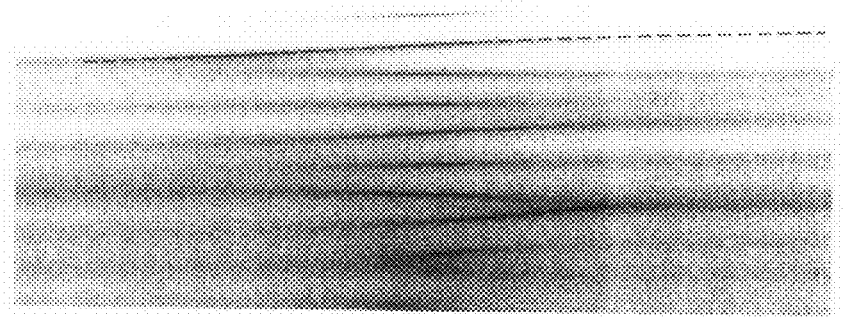

FIG. 18A shows a result of Fourier transformation of a photographed image of a CZP chart acquired when the camera 12 is rotated in the pitch direction. FIG. 18B shows a result of Fourier transformation of the PSF acquired before calibration of outputs from the gyroscopic sensors 14 and 16 when the camera 12 is rotated in the pitch direction. In these drawings, the zero-crossing lines are depicted by broken lines. As shown in FIG. 18B, when the outputs are not calibrated, a twist exists in the zero-crossing line of the data into which the PSF has been Fourier-transformed.

Figure 19A:
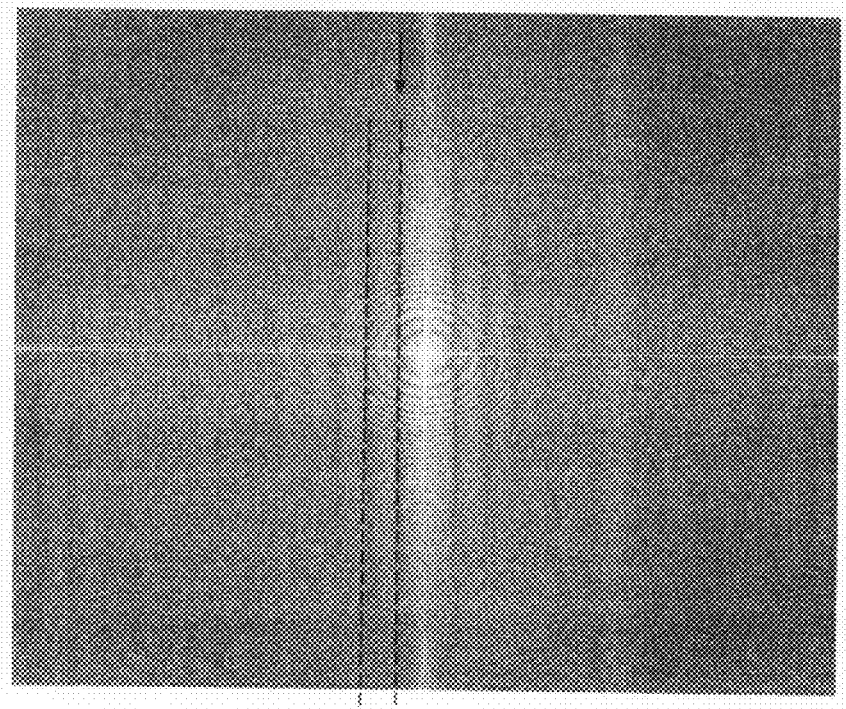
FIG. 19 is a descriptive view of a photographed image during rotation of the camera in the yaw direction and a result of Fourier transformation of a calibrated PSF.
Figure 19B:
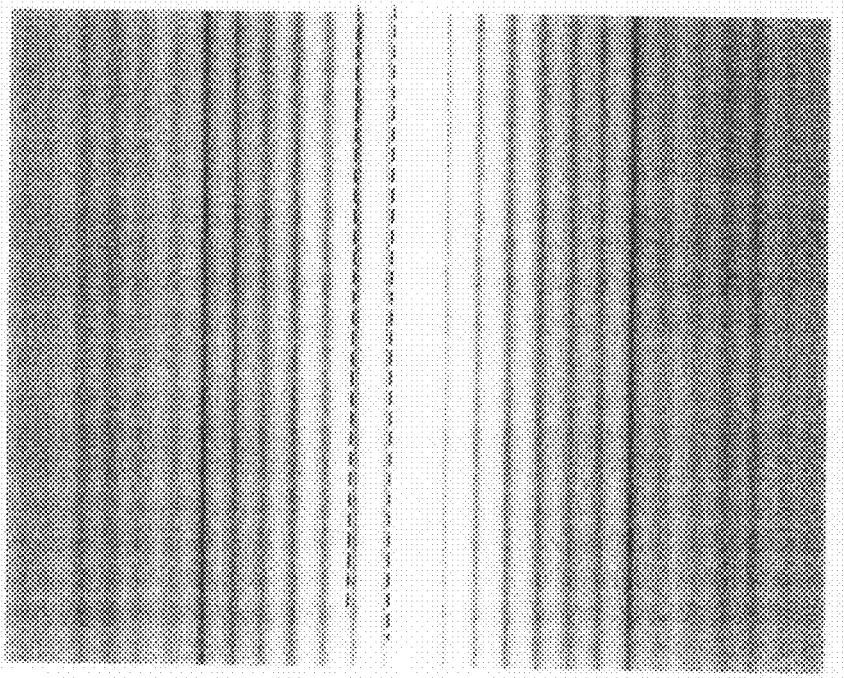

FIG. 19A shows a result of Fourier transformation of a photographed image of a CZP chart acquired when the camera 12 is rotated in the yaw direction. FIG. 19B shows a result of Fourier transformation of the PSF acquired by calibration of outputs from the gyroscopic sensors 14 and 16 when the camera 12 is rotated in the yaw direction. In these drawings, the zero-crossing lines are depicted by broken lines. The inclinations of both zero-crossing lines are vertical, and the widths of the zero-crossing lines essentially coincide with each other. The PSF is understood to have been made appropriate through calibration. When no coincidence exists between the zero-crossing lines, the error in the focal length of the photographing lens, the error in the sensitivities of the angular velocity sensors, and the error in the gain of the amplifying circuit are determined to be included. Therefore, the coefficient C is computed, and these errors are calibrated by one operation.

Figure 20A:
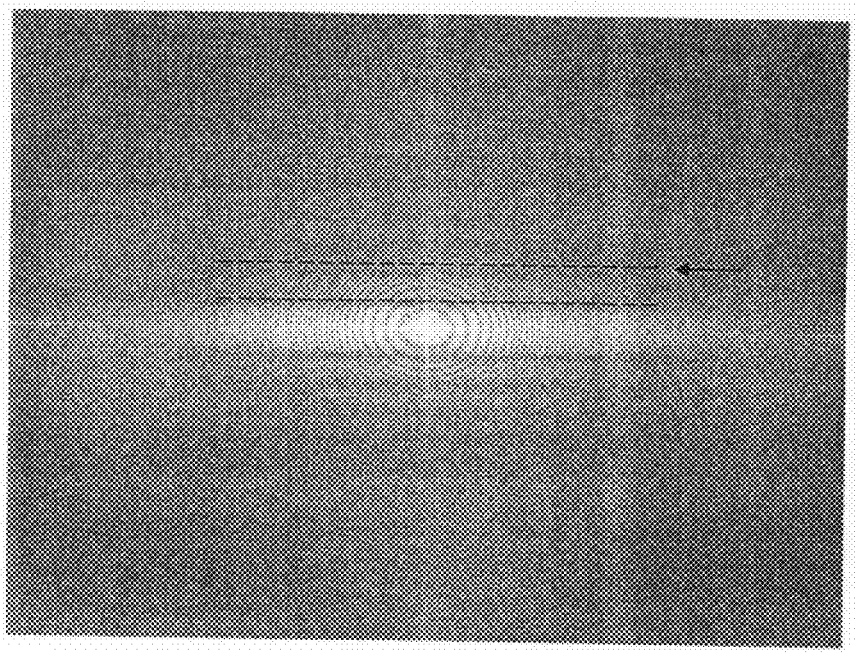
FIG. 20 is a descriptive view of a photographed image during rotation of the camera in the pitch direction and a result of Fourier transformation of a calibrated PSF.
Figure 20B:
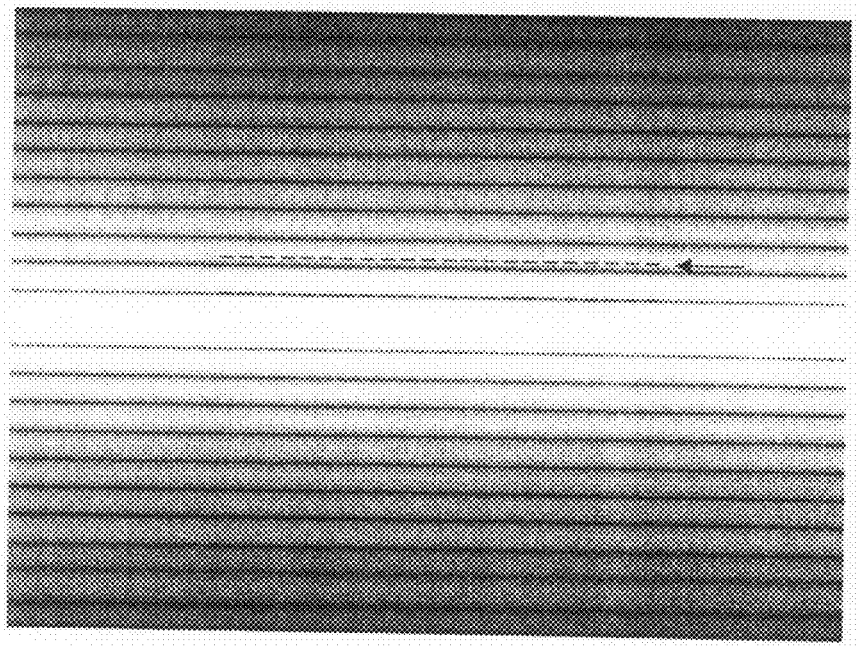

FIG. 20A shows a result of Fourier transformation of a photographed image of a CZP chart acquired when the camera 12 is rotated in the pitch direction. FIG. 20B shows a result of Fourier transformation of the PSF acquired by calibration of outputs from the gyroscopic sensors 14 and 16 when the camera 12 is rotated in the pitch direction. In these drawings, the zero-crossing lines are depicted by broken lines. The inclinations of both zero-crossing lines are horizontal, and the widths of the zero-crossing lines essentially coincide with each other. Even in this case, the PSF is understood to have been made appropriate through calibration. When no coincidence exists between the zero-crossing lines, the error in focal length, the sensitivity error, and the gain error are determined to be included. Therefore, the coefficient C is computed, and these errors are calibrated by one operation.

In the present embodiment, the sensitivity error and the gain error have been exemplified as an error included in an output from the angular velocity detection system, and the error in focal length has been exemplified as an error included in the photographing lens of the camera. When a PSF is computed from outputs from the angular velocity detection system and the focal length of the camera, all of errors included in the PSF are eliminated collectively. However, when the PSF is computed, an error in another optical component or an error in the detecting circuit may also be included. In the present embodiment, there is no necessity for specifying the nature of errors and the degree or ratio of mixtures of the errors.

PARTS LIST 10 rotating table
12 camera
14 gyroscopic sensor
16 gyroscopic sensor
18 gyroscopic sensor
20 CZP chart
22 computer
100 arrow

What is claimed is:

1. A method for eliminating an error in a camera having an angular velocity detection system, the method comprising:
   rotating the camera around a reference axis;
   acquiring an image while rotating the camera around the reference axis;
   computing motion of the camera as a locus of motion of a point light source on an imaging plane, from an output of angular velocity from the angular velocity detection system acquired when the camera has been rotated around the reference axis; and
   eliminating a plurality of errors included in the output of angular velocity and a photographing lens system, on the basis of the image and the locus of motion;
wherein the step of elimination includes the steps of:
   computing inclination of the locus of motion;

calibrating the output of angular velocity on the basis of the inclination;
computing a point spread function (PSF) from a calibrated locus of motion;
subjecting the PSF to Fourier transformation; and
comparing a zero-crossing point of data into which the PSF has been Fourier-transformed with a zero-crossing point of data into which the image is Fourier-transformed.

2. The method for eliminating an error in a camera having an angular velocity detection system according to claim 1, wherein the step of calibration includes computing a correction coefficient C by C =b/a by means of a plurality of error coefficients C, provided that a width of the zero-crossing point of data acquired by Fourier transformation of the PSF is taken as "a" and the width of the zero-crossing point of data acquired by Fourier-transformation of the photographed image of a circular zone plate chart is taken as "b".

* * * * *